Aug. 3, 1943.  I. SERRURIER  2,325,885

FILM WINDING MECHANISM

Filed Jan. 31, 1941

Inventor.
Iwan Serrurier.

Attorneys.

Patented Aug. 3, 1943

2,325,885

UNITED STATES PATENT OFFICE 2,325,885

FILM WINDING MECHANISM

Iwan Serrurier, Los Angeles, Calif.

Application January 31, 1941, Serial No. 376,765

4 Claims. (Cl. 242—55)

This invention relates generally to film winding and unwinding devices, particularly applicable to film viewing machines of the type disclosed in my prior Patent No. 1,873,341, or to any situation wherein it is desirable to drive a film in reverse directions between two film reels.

Film viewing machines of the type mentioned are often used for inspection of motion picture film prior to cutting. In carrying out such work, it becomes necessary to back the film up frequently in order to permit re-inspection of some particular portion of the film. The take-up and supply reels for the film must reverse their functions for reverse drive of the film, the supply reel becoming a take-up reel and the take-up reel becoming a supply reel. Machines designed to do this are known. They have, however, been burdened by certain disadvantageous arrangements. For example, the machine disclosed in my aforementioned patent employs a constantly applied spring actuated brake shoe bearing on the reel spindle, which serves the purpose of preventing overrunning of the reel when functioning as a supply reel. This brake shoe, however, remains applied while the reel is taking up film, at which time the spindle should be as free as possible. Another known machine has the reel spindle spring pressed constantly against a bearing, with the result that the spindle is again bound rather than free running when functioning as a take-up reel.

The object of the present invention is to provide a film winding device which permits free running of the reel spindle when the reel is functioning as a take-up reel, and which instantly applies a light frictional braking action to prevent overrunning when the reel functions as a supply reel.

The invention will be best understood from the following detailed description of a present illustrative embodiment thereof, reference for this purpose being had to the accompanying drawing, in which.

Figure 1:
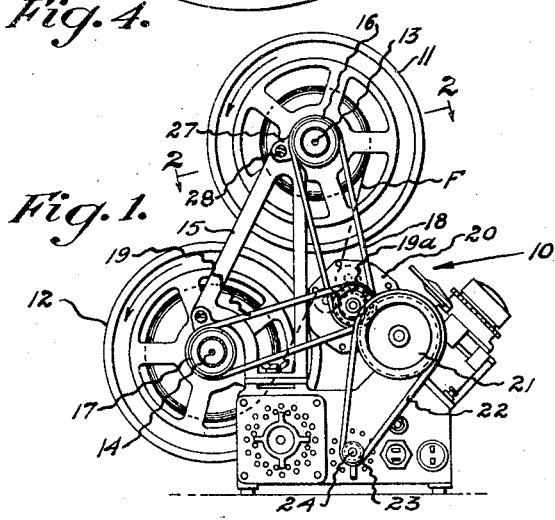
Fig. 1 is a side elevation of a film viewing machine of conventional type equipped with the present invention.

In Fig. 1 a film viewing machine of the type fully disclosed in my Patent No. 1,873,341 is designated generally by numeral 10, this machine having film supply reel 11, film take-up reel 12, and the film F being threaded through the machine between said reels as indicated. The reels 11 and 12 are on spindles 13 and 14, supported by frame 15, and are driven from pulleys 16 and 17, respectively, connected by driving belts 18 and 19 with a driving pulley 19a. The latter is driven through gears (not shown) contained in gear box 20 from a pulley 21 connected by belt 22 with pulley 23 on the shaft 24 of an electric drive motor (not shown).

Figure 2:
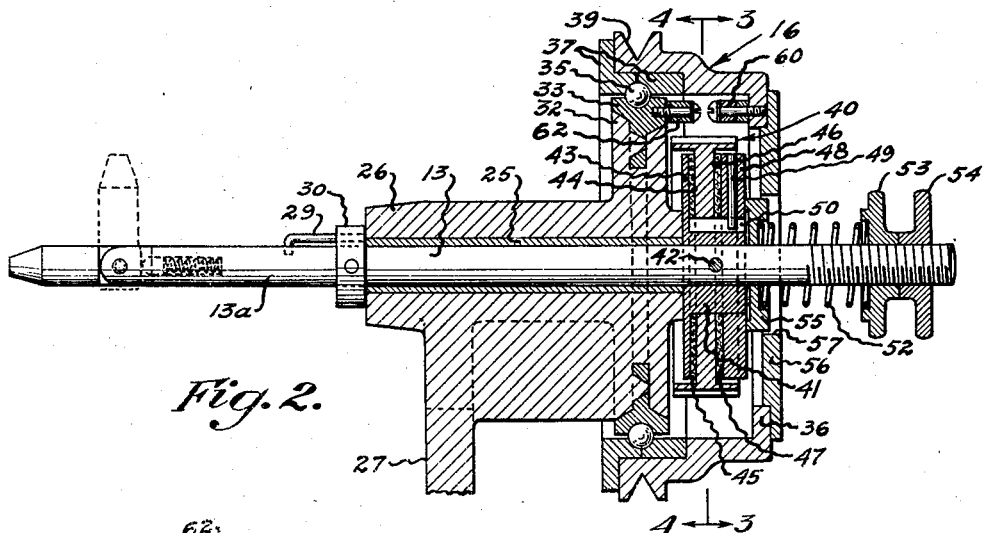
Fig. 2 is a section on line 2—2 of Fig. 1.

Fig. 2 is a section taken through reel spindle 13 for upper or supply reel 11; it will be understood, however, that a similar section taken through the reel spindle 14 for lower reel 12 would appear similar to Fig. 2, the winding devices for the two reels being exact counterparts of one another except for a right for left reversal, so that one will function as a supply reel when the other functions as a take-up reel.

As shown best in Fig. 2, spindle 13 is journaled in a bushing 25 set into bearing 26, the latter having an integrally formed supporting bracket 27 connected at 28 to the frame of the machine (see Fig. 1). The portion 13a of spindle 13 projecting from the end of bearing 26 is adapted to support a conventional reel such as 11, a key 29 on the spindle being adapted to engage the key-way in the reel to prevent relative rotation between spindle and reel. A collar 30 set on spindle 13 adjacent the end of bearing 26 cooperates with later described means to confine the spindle against axial movement with reference to the bearing 26. On the other end of bearing 26 is an enlarged portion 32 supporting a race ring 33 for bearing balls 35, the latter rotatably supporting the aforementioned pulley 16, as here shown engaging a split outer race ring 37 tightly mounted inside pulley 16. Pulley 16 is formed with V-groove 39 for the drive belt 18. Pulley 16 is thus rotatably mounted on the enlarged end portion 32 of bearing 26.

Surrounding spindle 13 inside pulley 16 is a ratchet wheel 40, which is relatively rotatable on a bearing sleeve 41 secured to spindle 13 as by pin 42, and formed adjacent the end of bearing 26 with an outwardly extending annular flange or disk 43. It is this disk 43 that cooperates with the collar 30 on the spindle 13 to confine said spindle against axial movement with relation to bearing 26.

Between disk 43 and the flat face 44 of ratchet wheel 40 is a friction disk 45 of felt or the like. On the other side of ratchet wheel 40, and bearing against the flat face 46 of said wheel, is a friction disk 47 of felt or the like. Adjacent friction disk 47 is a flat disk or washer 48 which has set therein a radially disposed pin or key 49 which engages in a longitudinal spline-way 50 formed in hub 41. Washer 48 is thus splined on hub 41, and is therefore axially movable but non-rotatable with reference to spindle 13. It may be regarded as splined on shaft or spindle 13.

A coil compression spring 52 encircling spindle 13 and supported by nut 53 and lock nut 54 exerts pressure against a washer 55 which is slidably mounted on spindle 13 and is formed to engage washer 48. A cover plate 56 secured to the inwardly extending annular flange 36 on the end of pulley 16 has a central aperture 57 which clears spring 52 as well as the washer 55. The spring 52 causes ratchet wheel 40 to be frictionally clamped between the members 43 and 48, which are non-rotatable on spindle 13. Attention is particularly called to the fact that the spring 52 exerts no endwise thrust on the spindle 13, hence has no effect in binding the spindle 13 against freedom of rotation within the bearing 26.

Mounted on the inner side of pulley flange 36 is a pawl 60 pressed against the teeth 40a of ratchet wheel 40 by means of a spring 61 also mounted on pulley flange 36. Mounted on the stationary inner race ring 33 is a pawl 62 which is pressed against the teeth of ratchet wheel 40 by a spring 63 supported by ring 33. As illustrated, the ratchet wheel 40 is made of sufficient width to accommodate the two pawls 60 and 62, and the latter are spaced from one another so as not to interfere in the operation of the device.

Figures 3, 4:
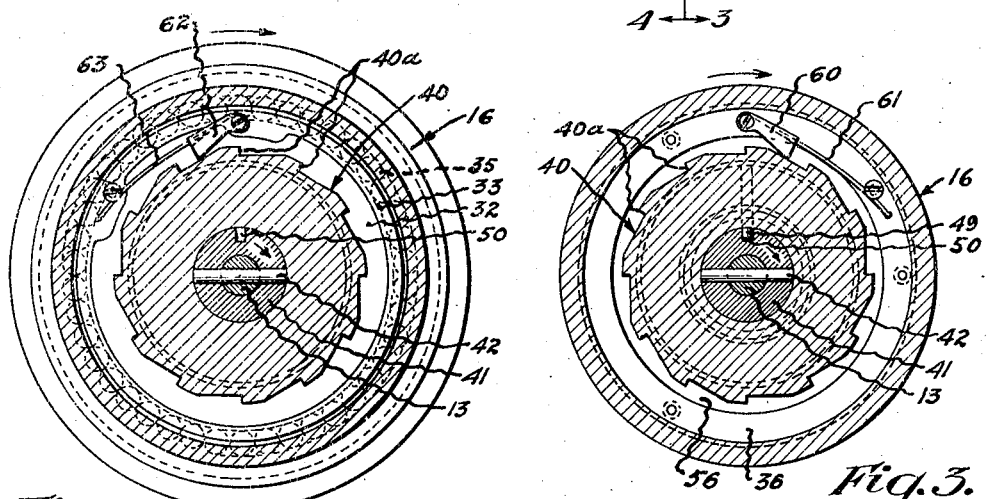
Fig. 3 is a transverse section taken on line 3—3 of Fig. 2.
Fig. 4 is a transverse section taken on line 4—4 of Fig. 2.

Assume first that the film is being driven from lower reel 12 toward upper reel 11, the latter functioning as a take-up reel. At such times the pulley 16 will be constantly driven by the belt 18, the direction of rotation being in the direction of the arrow in Fig. 3. Pawl 60 carried by pulley 16 engages ratchet wheel 40 and drives it in the same direction. The ratchet wheel drives spindle 13, and therefore the reel 11, through friction washers 45 and 47 and members 43 and 48, any necessary slippage owing to the growing diameter of the roll of film on the reel occurring between ratchet wheel 40 and the members 43 and 48. At such time, the spindle 13 is perfectly free-running, all braking action or other pressural restraints to rotation being removed.

For the other direction of film drive, that is, from reel 11 toward reel 12, the pulley 16 will again be driven by belt 18, but in the reverse direction, so that the pawl 60 carried by the pulley does not at this time drive ratchet wheel 40. The reel on the spindle 13 will at this time be rotating in a direction to unwind the film, the reel and spindle rotating in the direction of the arrow in Fig. 4. At this time, the teeth of ratchet wheel 40 will engage the stationarily mounted pawl 62, which prevents rotation of the ratchet wheel in such direction, so that frictional slippage must then take place between the ratchet wheel and the members 43 and 43. The friction between the described slipping members constitutes the braking force utilized to prevent overrunning of the reel under such conditions. This friction is adjustable by adjusting the compression of the spring by means of nuts 53 and 54. Thus a frictional drag is exerted on the spindle 13 carrying the reel when the reel functions as a supply reel, but this frictional drag is removed when the reel acts as a take-up reel. And when the reel is acting as a take-up reel, all braking or binding forces are removed from the spindle 13 that carries the reel, so that perfectly free rotation is secured—a feature which, insofar as I am aware, has not been heretofore attained in mechanism of this character.

It will be understood that the drawings and description are for illustrative purposes only, and that various changes in design, structure and arrangement may be made without departing from the spirit and scope of the invention or of the appended claims.

I claim:

1. A reel driving mechanism comprising a shaft bearing, a shaft mounted for free running rotation in said bearing and having portions projecting from both ends of said bearing, one projecting portion of said shaft being adapted to carry a film reel, a disk fast on the other projecting portion of said shaft, a disk splined on said shaft at a position located on the opposite side of said first mentioned disk from said bearing, a ratchet wheel surrounding said shaft between said disks, a head on the end portion of said other projecting portion of said shaft, a spring acting between said head and said splined disk to frictionally clamp said ratchet wheel between said two disks, said shaft acting in tension between said first mentioned disk and said head to resist the pressure of said spring, a pulley mounted for rotation on said bearing, pawl means mounted on said pulley drivingly engageable with said ratchet wheel for one direction of rotation of said pulley, and pawl means mounted on said bearing engageable with said ratchet wheel when the shaft is rotated in a direction the reverse of said one direction, all in such manner that frictional slippage occurs between the spring clamped ratchet wheel and said disks in said reverse direction of rotation of the shaft, while all spring pressural restraints to rotation of the shaft are removed when the pulley is driven in the first mentioned direction of rotation.

2. A reel driving mechanism comprising a shaft bearing, a shaft mounted for free running rotation in said bearing and having portions projecting from both ends of said bearing, one projecting portion of said shaft being adapted to carry a film reel, a friction clutch member fast on the other projecting portion of said shaft, a friction clutch member splined on said shaft at a position located on the opposite side of said first mentioned friction clutch member from said bearing, a member rotatable about said shaft between said two friction clutch members, a head on the end portion of said other projecting portion of said shaft, a spring acting between said head and said splined friction clutch member to press said splined friction clutch member toward said first mentioned friction clutch member and frictionally spring clamp said rotatable member therebetween, said shaft acting in tension between said fast friction clutch member and said head to resist the pressure of said spring, a pulley mounted for rotation on said bearing, ratchet means acting between said pulley and said spring clamped member to drive said member for one direction of rotation of the pulley, and ratchet means acting between said bearing and said spring clamped member acting to arrest rotation of said member when the shaft is rotated in a direction the reverse of said one direction, all in such manner that frictional slippage occurs between the spring clamped member and said friction clutch members in said reverse rotation of the shaft while all spring pressural restraints to rotation of the shaft are removed when the pulley is driven in the first mentioned direction of rotation.

3. A reel driving mechanism comprising a support, a shaft bearing supported by said support, a shaft mounted for free running rotation in said bearing, and having portions projecting from both ends of said bearing, one projecting portion of said shaft being adapted to carry a film reel, a friction clutch member fast on the other projecting portion of said shaft, a friction clutch member splined on said shaft at a position located on the opposite side of said first mentioned friction clutch member from said bearing, a member rotatable about said shaft between said two friction clutch members, a head on the end portion of said other projecting portion of said shaft, a spring acting between said head and said splined friction clutch member to press said splined friction clutch member toward said first mentioned friction clutch member and frictionally spring clamp said rotatable member therebetween, said shaft acting in tension between said fast friction clutch member and said head to resist the pressure of said spring, a rotatable pulley surrounding said shaft, ratchet means acting between said pulley and said spring clamped member to drive said member for one direction of rotation of the pulley, and stationarily mounted ratchet means carried by said support and acting on said spring clamped member to arrest rotation of said member when the shaft is rotated in a direction the reverse of said one direction, all in such manner that frictional slippage occurs between the spring clamped member and said friction clutch members in said reverse rotation of the shaft, while all spring pressural restrains to rotation of the shaft are removed when the pulley is driven in the first mentioned direction of rotation.

4. A reel driving mechanism comprising a support, a shaft bearing supported by said support, a shaft mounted for free running rotation in said bearing and having portions projecting from both ends of said bearing, one projecting portion of said shaft being adapted to carry a film reel, a friction clutch member fast on the other projecting portion of said shaft, a friction clutch member splined on said shaft at a position located on the opposite side of said first mentioned friction clutch member from said bearing, a member rotatable about said shaft between said two friction clutch members, a head on the end portion of said other projecting portion of said shaft, a spring acting between said head and said splined friction clutch member to press said splined friction clutch member toward said first mentioned friction clutch member and frictionally spring clamp said rotatable member therebetween, said shaft acting in tension between said fast friction clutch member and said head to resist the pressure of said spring, a hollow pulley rotatably mounted on said support, said hollow pulley surrounding said shaft and substantially enclosing said friction clutch members and said member spring clamped therebetween, ratchet means acting between said pulley and said spring clamped member to drive said member for one direction of rotation of the pulley, and ratchet means mounted on said support inside said pulley and acting on said spring clamped member inside said pulley to arrest rotation of said member when the shaft is rotated in a direction the reverse of said one direction, all in such manner that frictional slippage occurs between the spring clamped member and said friction clutch members in said reverse rotation of the shaft, while all spring pressural restraints to rotation of the shaft are removed when the pulley is driven in the first mentioned direction of rotation.

IWAN SERRURIER.